United States Patent [19]

Yamada et al.

[11] Patent Number: 5,050,528
[45] Date of Patent: Sep. 24, 1991

[54] ROTARY DRUM GRANULATING AND COATING APPARATUS

[75] Inventors: Shuri Yamada, Kawagoe; Goro Nagami, Tokyo, both of Japan

[73] Assignee: Freund Industrial Co., Ltd., Tokyo, Japan

[21] Appl. No.: 475,016

[22] Filed: Feb. 5, 1990

[30] Foreign Application Priority Data

Feb. 6, 1989 [JP] Japan .................................. 1-26980

[51] Int. Cl.$^5$ .............................................. B05C 5/00
[52] U.S. Cl. ...................................... 118/19; 118/58; 118/303; 366/105; 366/167; 366/175; 366/234; 34/133
[58] Field of Search ...................... 118/56, 58, 62, 63, 118/64, 303, 418, 19; 366/105, 167, 173, 174, 175, 220, 234; 34/130, 133

[56] References Cited

U.S. PATENT DOCUMENTS

| | | | |
|---|---|---|---|
| 4,133,290 | 1/1979 | Melliger | 118/303 |
| 4,576,108 | 3/1986 | Socola et al. | 118/303 |
| 4,725,446 | 2/1988 | Forster et al. | 118/303 |
| 4,749,348 | 6/1988 | Thuring et al. | 118/303 |
| 4,766,839 | 8/1988 | Dunajtschik | 118/303 |

Primary Examiner—Richard V. Fisher
Assistant Examiner—Todd J. Burns
Attorney, Agent, or Firm—Kane, Dalsimer, Sullivan, Kurucz, Levy, Eisele and Richard

[57] ABSTRACT

A granulating and coating method featuring that a coating liquid and a binder liquid are fed into a rotary drum so as to carry out granulating and coating of a powdery and/or granular material, wherein the coating is performed while a gas is blown out to the rear of the rotating direction of the drum relative to a nozzle unit for feeding the coating liquid of an aqueous type including an emulsion and a suspension into the drum. A granulating and coating apparatus featuring that a nozzle unit for feeding at least one of a coating liquid and a binder liquid into a rotary drum is provided, wherein a gas blow-out portion of a duct is provided near the nozzle unit and the direction of the blow-out is adjustable relative to the nozzle unit. Further the apparatus is provided with a perforated ventilating member over a gas blow-out opening.

4 Claims, 4 Drawing Sheets

ROTARY DRUM GRANULATING AND COATING APPARATUS

BACKGROUND OF THE INVENTION

1. Field of the Invention

This invention relates to a granulating and coating technique, and more particularly to a technique wherein a powdery and/or granular material is placed in a rotary drum and then the drum is rotated about a substantially horizontal shaft so as to perform granulating and coating of the powdery and/or granular material.

2. Description of the Related Art

As a granulating and coating technique of the type described, there has been known a technique wherein a rotary drum, called also a coating pan, is rotated about a horizontal shaft and a gas such as hot air is fed into the rotary drum and discharged therefrom, whereby a powdery and/or granular material, such as pharmaceuticals, food products, chemical products and other various materials, is granulated and/or coated within the rotary drum.

In the granulating and coating apparatus of the type described, in order to feed a coating liquid and/or a binder liquid to articles to be coated contained in the rotary drum, i.e. the powdery or granular material, a nozzle unit constituted by a spray nozzle is inserted therein.

Now, with the ordinary construction, the nozzle unit is extended through a hot air supply passage into the rotary drum, whereby the coating liquid and the like in the nozzle unit is heated by the hot air and hardened finally, so that smooth liquid supply may become impossible.

Then, to obviate this problem, among granulating and coating apparatuses of the type IDA.X (IDA. 500. 750. 1000. X.) manufactured and marketed by Dumoulin Co. of France, there are apparatuses wherein a gas blow-out tube is provided at an axial portion of a rotary drum, the direction of gas blow-out being fixed.

However, the inventors of the present invention have found out problems with this fixed-type gas blowout tube. Namely, as the direction of the blow-out gas from the tube is constant, it is impossible to variably adjust the direction and the flow rate of the blow-out gas depending on the properties of the coating liquid and the types of the products to be coated. Thus, the intended effects cannot necessarily be achieved.

For example, an aqueous type coating liquid varies between one using an aqueous solution of water-soluble substance such as hydroxipropylcellulose or hydroxipropylmethylcellulose; one using an emulsion such as Eudragit; and one using a suspension in which very small powder of carboxymethylethylcellulose (CMEC) or hydroxypropylmethylcellulose acetate succinate (AQOAT) is suspended in an aqueous solvent medium. There are large differences in film-making properties in these substances. And, when a main component to be coated is easily water-soluble, it is necessary to perform drying quicker than main component which is not easily water-soluble. With the gas blow out tube in which the gas blow-out direction is fixed, the drying process is always same, so that the various requirements as described above cannot be met.

Further, the present inventors have also found that, in the case of the aqueous type coating using a dispersion such as an emulsion or a suspension, a high quality product can be obtained when granulating and coating are carried out while the gas is blown out to the rear in the rotating direction of the rotary drum relative to the nozzle unit for feeding the coating liquid.

It is an object of the present invention to provide a granulation coating technique being widely compatible with the characteristic properties of the coating liquids and the products to be coated and capable of obtaining a high quality product.

It is another object of the present invention to provide a granulation coating technique capable of obtaining a high quality product even when the gas blow-out direction is fixed.

The above described objects, other objects and novel characteristics of the present invention will become clear from description of the present specification and the accompanying drawings.

SUMMARY OF THE INVENTION

Now, out of the aspects of the present invention disclosed in this specification, typical one will be outlined.

Namely, the method of granulating and coating according to the present invention is such that the granulating/coating is carried out while the gas is blown out to the rear in the rotating direction of the rotary drum relative to the nozzle unit for feeding the coating liquid into the rotary drum.

Furthermore, the apparatus for granulating and coating according to the present invention is of such an arrangement that a gas blow-out means formed independently of the nozzle unit is provided in the vicinity of the nozzle unit for feeding the coating liquid and the like and the gas blow-out direction of this gas blow-out means is made variable with respect to the nozzle unit.

According to the method of granulating and coating of the present invention, the coating liquid adhering to the outer surfaces of the powdery or granular material stays longer in the wet state, and, when the emulsion or the suspension is used, satisfactory films are formed to obtain uniform coating layers, so that the coating layers can be made thin, thus minimizing the usage of the coating liquid.

Furthermore, according to the apparatus of the present invention, the gas blow-out direction is adjustable in accordance with the purposes, so that a most suitable granulating/coating can be achieved in accordance with the characteristic properties of the coating liquid and the products to be coated, and in accordance with processes of granulating and coating, thus, a high quality product compatible with the predetermined objects can be obtained.

DESCRIPTION OF THE PREFERRED EMBODIMENT

Figure 1:
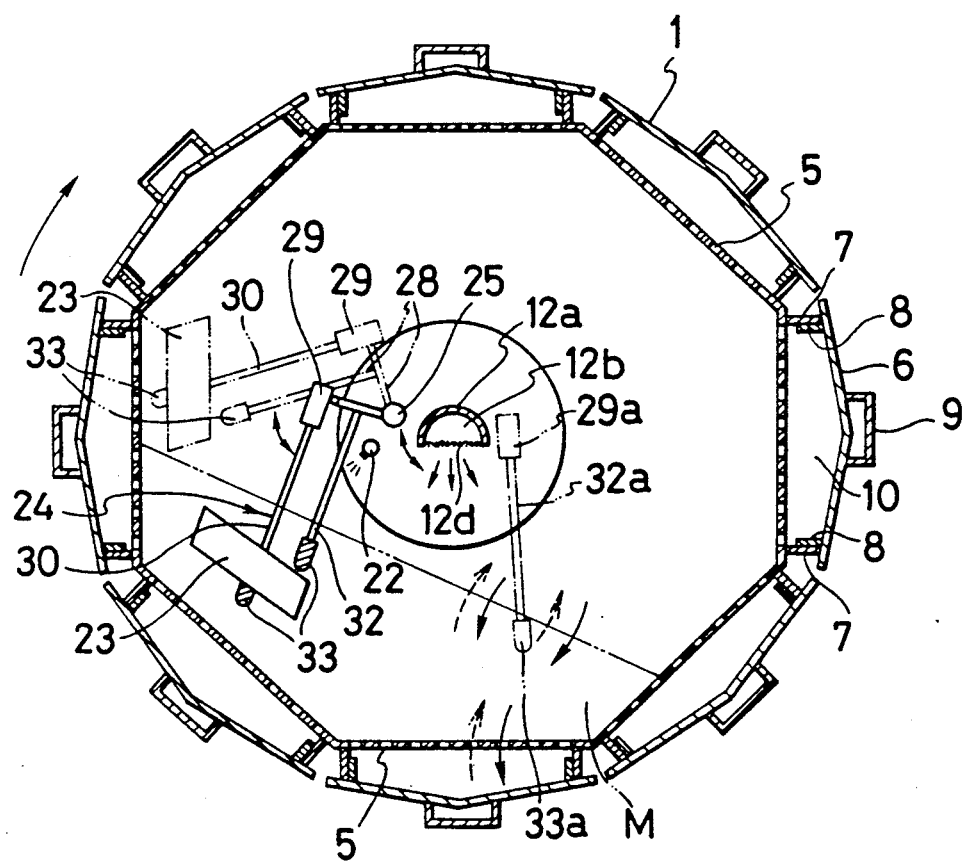
FIG. 1 is a sectional view of a granulating and coating apparatus embodying the present invention.

Firstly, description will be given of the apparatus for granulating and coating according to the present invention with reference to FIGS. 1 to 3. A rotary drum 1 containing a powdery and/or granular material such as tablets, which are articles to be processed, is supported on a rollers 4 in such a manner as to be rotated about a horizontal axis by a driving source 2 such as a motor through a transmission means 3 such as a belt.

The rotary drum 1 of this embodiment has a construction of an octagonal section as an example of a polygon, so that the slip of the powdery or granular material in the rotary drum 1 can be controlled. Pores 5 are formed by punching for example at predetermined portions in every sides of this octagonal rotary drum 1. To make this rotary drum 1 with the pores 5, the plate members of the predetermined size are formed therein with the pores 5, then these perforated plate members might be welded to one another into an octagonal shape. Or, otherwise, eight plate members with the pores 5 might be welded into a frame.

In the every sides of the octagon of this rotary drum 1, there are provided tightly sealed jackets, i.e. outer enclosure members 6, individually mounted on every sides of the octagon and demounted therefrom so that the outer peripheral surface of the drum with the pores 5 can be easily and reliably washed clean.

Each of the outer enclosure members 6 has a size corresponding to each of the sides of the octagon of the rotary drum 1. Each of the outer enclosure members 6 is tightly sealed and mountable to each of the sides of the rotary drum 1 or demountable therefrom by use of a hand grip 9, for example, in such a manner that flanges 7 welded to the outer surface of each of the sides of the drum is coupled to flanges 8 welded to the inner surface of the outer enclosure member 6. A space defined by the outer peripheral surface of each of the sides of the rotary drum 1, the inner surface of the outer enclosure member 6 and the flanges 7, 8 is formed to be a gas flow space 10.

Furthermore, ducts 11, 12 are provided to supply a gas, a hot air or a cooling gas for example into the rotary drum 1 or discharge the same therefrom. The supply and discharge of the gas can be reversed when the ducts 11, 12 are used as in the case shown by broken lines, compared with the case shown by solid lines.

To switch the supply and the discharge of the gas in a gas flow passage from the ducts 11 or 12 through the interior of the rotary drum 1 to the ducts 12 or 11, a disk valve mechanism 13 is provided at the side of operation (front side, i.e. the left side in FIG. 2) for allowing access of an operator to the apparatus.

The disk valve mechanism 13 is constituted by a rotary disk 14 provided at the side of operation (front side) of the rotary drum 1 and rotating together with the rotary drum 1 and a non-rotating disk 15 being in slidable contact with the outer surface, i.e. the side of operation ( the left side in FIG. 2), of this rotary disk 14.

A plurality of slots 16 communicated with the above-described gas flow space 10 are provided in the rotary disk 14. Furthermore, an arcuate recess 17 selectively communicated with any one or a plurality of the slots 16 is formed in the non-rotating disk 15.

In consequence, the slots 16 of rotary disk 14 and the recess 17 of the non-rotating disk 15 are selectively communicated with each other depending upon the rotational position of the rotary drum 1. More particularly, at a position where a powdery and/or granular material layer M (See FIG. 1) is present in the rotary drum 1, one or a plurality of slots 16 are selectively communicated with the recess 17. Therefore, the supply of the gas into the rotary drum 1 or the discharge of the gas therefrom can be switched selectively through the thus formed flow passage.

The disk valve mechanism 13 of this embodiment is provided at the front side, i.e. the side of operation of the rotary drum 1, so that the operation, e.g. washing operation is easy. And, in addition, as apparent from FIG. 2, the non-rotating disk 15 is held by three slidable shafts 18 (only two slidable shafts are shown in the drawing), and, thus, can be drawn out from a solid line position to a two-dot chain line position toward the front surface, i.e. the side of operation.

Furthermore, to make it possible to draw the non-rotating disk 15 out to the side of operation, a product take-out opening 19 of the rotary drum 1, which is positioned further nearer to the side of operation than the non-rotating disk 15, can be drawn out toward the side of operation from the assembled state (shown by solid lines) by slidable shafts 20. By reference numeral 21 in FIG. 2, is denoted a product discharge tube for taking the product out of the rotary drum 1.

In consequence, with the disk valve mechanism 13 of this embodiment, the non-rotating disk 15 is drawn out toward the side of operation after the draw-out of the product take-out opening 19, so that the operator can enter a space formed by the product take-out opening 19 and the non-rotating disk 15 after they are drawn out, and can wash the disk valve mechanism and inspect the same easily.

Figure 2:
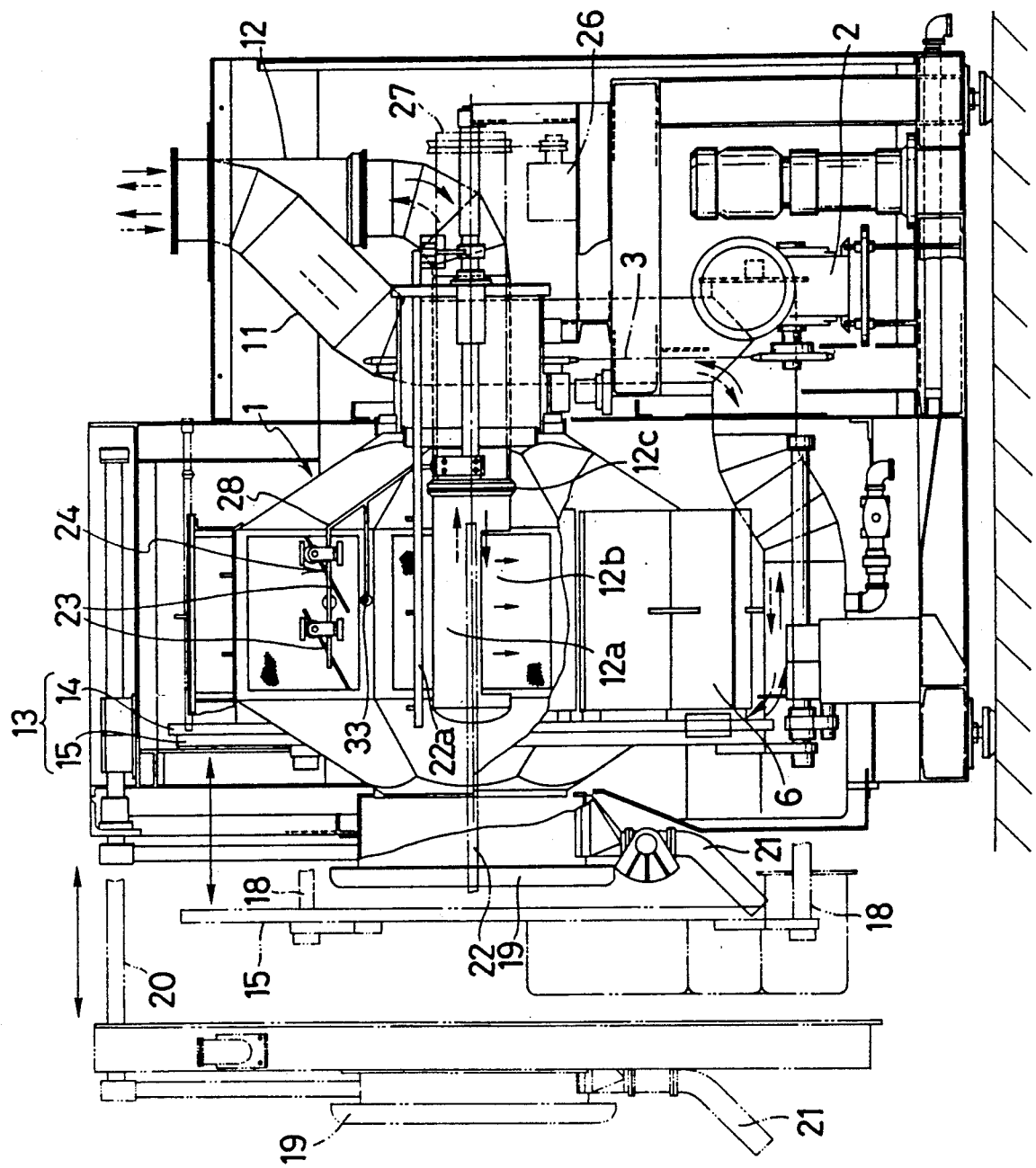
FIG. 2 is a partly broken side view showing the general arrangement of the granulating and coating apparatus of the above embodiment.
Figure 3:
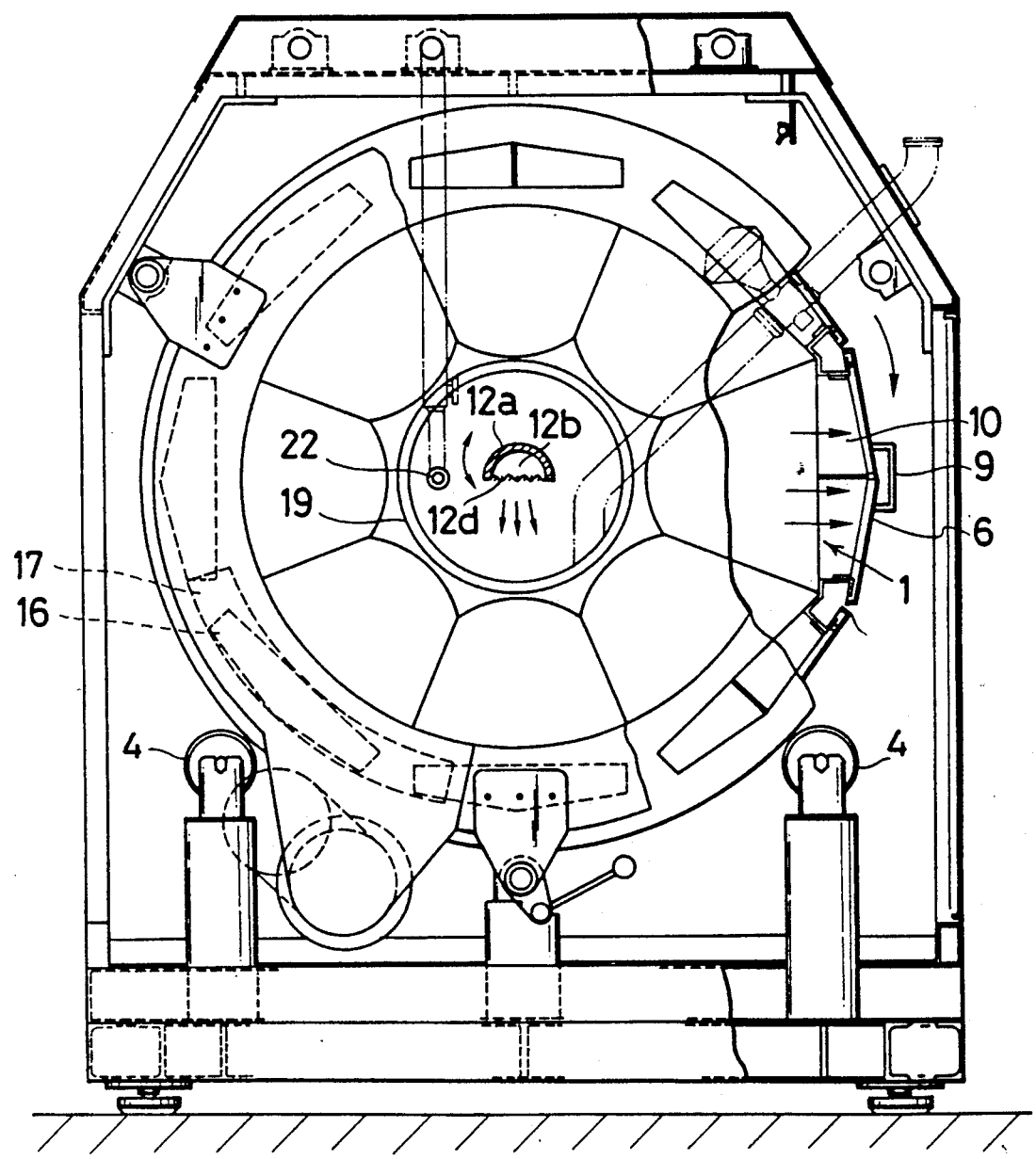
FIG. 3 is a front view as viewed from the side of operation in the front.

Further, in this embodiment, as shown in FIG. 3, a nozzle unit 22 for feeding a coating liquid and/or a binder liquid into the rotary drum 1 is inserted in the axial direction from the front side ( to the left in FIG. 2) of the rotary drum 1 into the rotary drum 1.

In this embodiment, a gas blow-out portion 12a as being a gas blow-out means is provided at the forward end of the above-described duct 12. And, in the vicinity of the nozzle unit 22, a gas blow-out opening 12b of the gas blow-out portion 12a is opened in the axial direction and can blow out a hot air or a cold air from the duct 12.

In this embodiment, the gas blow-out portion 12a of this duct 12 can be rotated or rocked through a desired angle relative to other portions of the duct 12 manually by untightening a clamping plate at a rotary portion 12c, or automatically by a motor 26 through a rotary shaft 27 which are indicated by two-dot chain lines in FIG. 2.

As the gas blow-out portion 12a is manually or automatically rotated or rocked through the desired angle, a direction of gas blow-out from the gas blow-out opening 12b can be variably adjusted relative to the nozzle unit 22.

Furthermore, in this embodiment, a net (a porous ventilating member) 12d is provided to stretch over the gas blow-out opening 12b of the duct 12. The provision of this net 12d uniformalizes the gas blow rates both at the proximal end and at the forward end of the gas blow-out opening 12b.

Reference numeral 22a in FIG. 2 denotes another nozzle unit for feeding a washing liquid into the rotary drum 1.

Furthermore, a baffle means for agitating the powdery and/or granular material in the rotary drum 1 is provided in the rotary drum 1. Namely, in this embodiment, the baffle means is constituted by a baffle board 23. As indicated by solid and two-dot chain lines in FIG. 1, this baffle board 23 can be displaced by a baffle displacing means 24 within a scope from the interior to the exterior of the powdery and/or granular material layer M in the rotary drum 1.

The baffle displacing means 24 will hereunder be described. As shown in FIG. 1, the baffle displacing means 24 in this embodiment comprises: a rotary shaft 25; an air cylinder for rotating or rocking this rotary shaft 25 within an angular range of about 120 degrees for example and another air cylinder for moving the rotary shaft 25 in the axial direction thereof, both of the cylinders being not shown; a generally L-shaped support arm 28 integrally secured to an end portion of the rotary shaft 25 at a predetermined angle; an actuator 29 such for example as a rectilinearly moving and rocking type one, which is secured to the forward end of this support arm 28; and a mounting bar 30 to be rectilinearly moved and rocked by the actuator 29.

The baffle board 23 is mounted to the mounting bar 30 at a predetermined angle.

In consequence, when piston rods of the air cylinders are rectilinearly moved and retracted to rock the rotary shaft 25 through a predetermined angle, the baffle board 23 is displaced through a desirable displacement value between a solid line position and a two-dot chain lines in FIG. 1 together with the support arm 28, the mounting bar 30 and the like.

Furthermore, to supply a working air (compressed air) into the actuator 29 and discharge the same therefrom, a fluid passage, not shown, is formed in the insides of the rotary shaft 25 and the support arm 28 in their axial directions. The working air is supplied from an air piping, not shown, connected to the rotary shaft 25, passing through this fluid passage, not shown, to the actuator 29 and discharged from the actuator 29, whereby the actuator 29 is operated, so that the mounting bar 30 and the baffle board 23 can be rotated or can be displaced in its axial direction.

Incidentally, the mounting bar 30 may be directly secured to the support arm 28 without the actuator 29 being interposed, so that the mounting bar 30 may be displaced in accordance with the displacement of the support arm 20, thus varying the position of the baffle board 23.

Further, in this embodiment, to directly measure the temperature of the powdery and/or granular material in the rotary drum 1, temperature sensors 33 supported by sensor mounting arms 32 are secured at two positions of the support arm 28 of the baffle displacing means 24. Furthermore, in this embodiment, to perform the direct temperature measuring of the powdery and/or granular material more reliably and accurately, a temperature sensor 33 is also secured to the forward end of the baffle board 23.

These temperature sensors 33 are used for detecting temperature of the powdery and/or granular material or the product in order to optimally control a liquid spray flow rate from the nozzle unit 22 into the rotary drum 1, a gas feed or discharge flow rate from the ducts 11, 12, and further, the temperatures of the fed and discharged gases by use of a control unit, not shown.

The temperature sensors 33 are inserted into the powdery and/or granular material layer M to be brought into direct contact with the powdery and/or granular material to measure the temperatures, so that it is possible to measure the temperatures with very high accuracy, and in addition, to render the temperature sensors 33 compact in size.

As a temperature sensor 33 of the direct contact type, a temperature sensor of a thermocouple type or of a platinum contact type for example can be used. However, depending on the cases, a temperature sensor of an infrared fiber scope type which is directly inserted into the powdery and/or granular material layer M may be used. Of course, the number of the temperature sensors to be provided may be desirably selected from one and thereabove, and is not limited to a specified number.

Particularly, the temperature sensors 33 in this embodiment are supported by the support arms 28 of the baffle displacing means 24, the temperature sensors 33 can be displaced together with the support arms 28, can detect the temperature at desirable positions in the powdery and/or granular material layer M, can follow changes in the powdery and/or granular material layer M, and further, when unnecessary, the temperature sensors 33 can be retracted to the exterior of the powdery and/or granular material layer M to be positioned there, as indicated by two-dot chain lines in FIG. 1.

The temperature sensor should not necessarily be secured to the baffle displacing means 24. As a temperature sensor 33a indicated by two-dot chain lines in FIG. 1 for example, the temperature sensor may be secured to a sensor mounting arm 32a formed independently of the baffle displacing means 24. In this case, the temperature sensor may be supported variably in the axial direction by a rectilinearly movable type actuator 29a so that the measuring position of the temperature sensor 33a can be variably adjusted, thus proving highly useful.

Further, the temperature sensor should not necessary be one of the direct contact type and one of the non contact type may be used, only if the temperature sensor can directly measure the temperature of the powdery and/or granular material in the rotary drum 1.

Action of a granulating and coating apparatus in this embodiment will hereunder be described.

Firstly, a predetermined quantity of the raw powdery and/or granular material is loaded into the rotary drum 1. Then, while the rotary drum 1 is rotated by the driving source 2 through transmission means 3, a predetermined quantity of the coating liquid and the like from the nozzle unit 22 is fed into the rotary drum 1, and, as necessary, the gas such as the hot air or cooling gas is fed from the ducts 11 or 12 to the rotary drum 1 or discharged therefrom.

By continuing the above-described operations, the powdery and/or granular material is tumbled in the rotary drum 1, whereby a predetermined granulating and coating operation can be performed.

In this case, in this embodiment, the direction of the blow-out gas from the gas blow-out opening 12b of the gas blow-out portion 12a of the duct 12 can be variably adjusted by rotating or rocking the gas blow-out portion 12a about the axis at the rotary portion 12c.

Figure 4A:
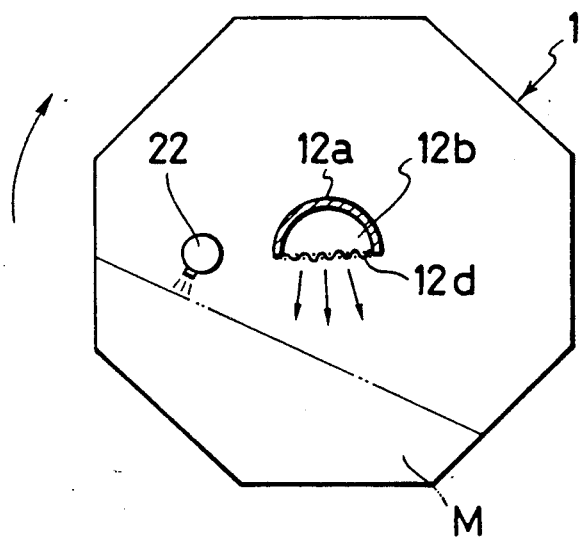
FIGS. 4A and 4B are explanatory views showing the gas blow-out means according to the present invention.

Namely, as shown in FIG. 4A for example, when the gas blow out opening 12b is directed downward, i.e. to the direction of the powdery and/or granular material layer M, the gas is not blown out to the direction of the nozzle unit 22 and is exclusively blown out to the rear of the nozzle unit 22 relative to the rotating direction of the rotary drum 1 (clockwise direction as shown), whereby a time period during which the powdery and/or granular material is wetted by the coating liquid adhering onto the powdery and/or granular material is long, so that uniform coating can be achieved.

Figure 4B:
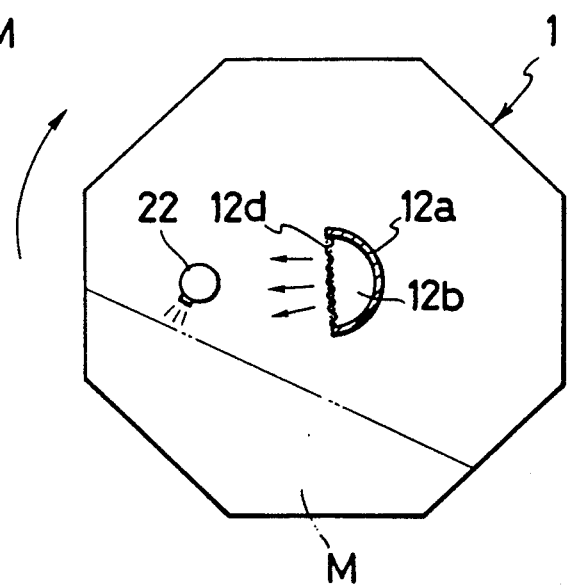

On the other hand, as shown in FIG. 4B, when the gas is blown out from the gas blow-out opening 12b to the direction of the nozzle unit 22, drying of the coating liquid is performed for a short period of time, so that this method is suitable when the short drying is required.

In consequence, in this embodiment, the gas blow-out portion 12a is rotated or rocked about the axis thereof manually or automatically, so that the most suitable granulating and coating can be achieved in accordance with the type of a powdery and/or granular material, the properties of the coating liquids, the processes of granulating and coating or the like.

Further, in the case of this embodiment, the net 12d is stretchedly provided over the gas blow-out opening 12b of the duct 12, whereby, through the action of this net 12d, the flow rates of the gas blown out of the gas blown-out opening 12b are substantially uniformalized both at the proximal end and the forward end, so that, advantageously, it becomes possible to make the uniform treatment by the uniform gas blow-out in the wide range.

Furthermore, the present inventors have found that, when the coating is performed by use of an aqueous type coating liquid using a dispersion type base material such for example as an emulsion or a suspension, if the direction of the gas blow-out from the gas blow-out opening 12b is to the rear of the nozzle unit 22 relative to the rotating direction of the rotary drum 1 as in FIG. 4A, then a very satisfactory granulating and coating can be achieved.

Generally, in the case of the emulsion and suspension, the film making property is not satisfactory, and, therefore, the film produced is in unsatisfactory conditions and usually tends to become porous film. However, when the granulating and coating is performed in the above-described gas blow-out direction, the powdery and/or granular material is wetted by the coating liquid for a long period of time, so that a high quality coating product with no uneven coating such as pores can be obtained. Therefore, the coating layer can be made thin, and, accordingly, the coating liquid used can be advantageously minimized.

Particularly, when the coating of an intestine dissolvent was carried out by the above-described method, uniform products without pores were obtained and the quantity of the coating liquid was only 7% as compared with 15% in the past, so that a desirable intestine dissolvent which was dissolved in the bowel but not in the stomach was obtained.

In this case, as the emulsion, it was suitable to use Eudragit (trade name) placed on the market by Rohm Pharma Co., Ltd. in West Germany, and, as the suspension, it was suitable to use CMEC (carboxymethylethylcellulose) placed on the market by Freund Industrial Co., Ltd. and AQOAT (trade name) (hydroxypropylmethylcellulose acetate succinate) manufactured and place on the market by Shin-etsu, Ltd.

Furthermore, in this embodiment, the provision of the displaceable baffle board 23 in the rotary drum 1 makes it possible that the powdery and/or granular material under treatment can receive an optimum agitating-mixing action, so that an efficient and uniform granulating and coating operation is achieved.

Namely, the baffle board 23 as being the baffle means in this embodiment is supported by the baffle displacing means 24, whereby the rotating shaft 25 of the baffle displacing means 24 is rocked by the air cylinder, not shown, through the required angle, so that the baffle board 23 is variably adjusted to a required position in the powdery and/or granular material layer M through the support arm 28 and the mounting bar 30. And moreover, when unnecessary, the baffle board 23 can be displaced to the exterior of the powdery and/or granular material layer M (Refer to two-dot chain lines in FIG. 1), thus enabling to perform an optimal agitating and mixing.

Furthermore, in the present embodiment, the temperature of the powdery and/or granular material in the rotary drum 1 is directly measured by the temperature sensors 33 and 33a in direct contact or in non-contact conditions, whereby accurate temperature measuring can be reliably carried out, so that the spray flow rate of the coating liquid and the like, the feed and discharge gas flow rates, the feed and discharge gas temperatures and the like can be optimally controlled on the basis of the results of measuring.

Further, in the granulating and coating apparatus in this embodiment, the disk valve mechanism 13 which switches the feed of the gas into the rotary drum 1 and the discharge of the gas therefrom is provided at the front surface, i.e. the side of operation of the rotary drum 1, and moreover, the non-rotating disk 15 can be drawn out to the side of operation, whereby washing, maintenance and the like of the disk valve mechanism 13 can be performed easily and reliably, so that, when the granulating and coating apparatus is applied to the granulating and coating of the powdery and/or granular material, which requires particularly high cleanliness as in the cases of pharmaceuticals and food products, the apparatus is highly effective.

Furthermore, in this embodiment, the periphery of the rotary drum 1 is formed of the perforated member with pores 5, of the polygonal shape, and the outer enclosure members 6 are individually detachably provided at every sides of the outer periphery of the rotary drum 1. Therefore, only when the outer closure members 6 are simply removed, the outer periphery of the rotary drum 1 can be washed clean easily and reliably, so that, advantageously, cleanliness and maintenance properties can be improved.

As for the product completed in its granulating and coating, the rotary drum 1 is reversely moved for example, and the product is taken out of the product discharge tube 21 of the product take-out opening 19 for recovery.

The invention has been described hereinabove in detail with reference to the embodiment. However, the present invention should not necessarily be limited to the above embodiment, and, needless to say, the invention is variously changeable within the scope of the invention.

In order to change the direction of the gas blow-out from the gas blow-out opening 12of the duct 12, for example, a baffle plate may be provided at the gas blow out opening 12b to change the direction of the gas blow-out instead of rotating the gas blow-out portion 12a about the axis thereof.

Furthermore, the net 12d of the gas blow-out opening 12b may be replaced with the other perforated ventilating member such as a perforated plate, or, as the case may be, the net 12d may be omitted.

Further, the nozzle unit 22 should not necessarily be of the spray nozzle type.

Furthermore, the rotating mechanism of the nozzle unit 22 may be one other than that described in the above embodiment.

Further, the shape and size of the baffle board 23, further, the construction of the baffle displacing means 24 thereof and the like should not necessarily be limited to the ones described in the above embodiment.

Furthermore, the types, the supporting methods and the numbers of the temperature sensors 33 and 33a are not limited by the above embodiment.

Further, the constructions and the supporting methods of the disk valve mechanism 13, the rotary disk 14 and the non-rotating disk 15 thereof may be ones other than those in the above embodiment.

Furthermore, the construction and method of mounting and demounting of the outer enclosure member 6 of the rotary drum 1, further, the assembling method of the perforated member with the pores 5 and the like are not limited to the above embodiment.

Further, it is optional that the actuators 29, 29a may be of hydraulic or electrically operated type other than the pneumatic type, or the piping method may be changed.

In the foregoing, the invention has been described as applied to the granulating and coating of the pharmaceuticals, food products and chemical products as the fields of use. However, the invention is not limited to this, and the invention is widely applied to the granulating and coating of the other powdery and/or granular material. And further, the present invention can be applied to the powdery and/or granular material treatment such as drying and mixing.

The followings are the brief descriptions of outlines of the typical aspects of the invention disclosed in the present application.

(1) The granulating and coating are performed while the gas is blown out to the rear of the rotating direction of the rotary drum relative to the nozzle unit for feeding the coating liquid into the rotary drum, whereby the coating liquid adheres to the exteriors of the powdery and/or granular material in the wetted conditions for the long period of time, so that the uniform coating can be performed, thus enabling to minimize the usage of the coating liquid.

(2) The direction of the gas blow-out provided independently of the nozzle unit is made adjustable relative to the nozzle unit, the optimum and desirable granulating and coating can be always performed in accordance with the type of the coating liquids, the products to be coated, further, the stages of the granulating and coating and the like.

(3) The provision of the perforated ventilating member at the gas blow-out opening makes it possible that the blow-out flow rate of the gas is not large only at the forward end of the gas blow-out opening. Flow rate becomes substantially uniform both at the proximal end and at the forward end, so that uniform products due to the uniform gas blow-out from the entire gas blow-out opening can be obtained.

Examples of Experiments

Aqueous coatings of intestine dissolvent films were performed on AVICEL/PERFILLER (both are trade names, AVICEL: crystalline cellulose, made by Asahi Chemical Industry Co., Ltd. and PERFILLER: granulated mixture of synthetic aluminum silicate, hydroxy propyl starch and crystalline cellulose, made by Freund Industrial Co., Ltd.) (1:1) tablets ($\phi$ 8.0 mm, 180 mg/tablet, having degrees of quick degradation) by use of CMEC, AQOAT and Eudragit (L30D-55).

Table 1 shows the formulae of the liquids (weight %) in that case.

TABLE 1

| FORMULAE OF THE LIQUIDS (weight %) | |
|---|---|
| CMEC | |
| film agent | 12.00 |
| medium chain triglyceride (MGK) | 3.60 |
| sodium citrate | 1.05 |
| water | 83.35 |
| AQOAT | |
| film agent | 10.00 |
| triethyl citrate | 2.80 |
| talc | 3.00 |
| water | 84.20 |
| Eudragit (L30D-55) | |
| film agent | 47.17 |
| polyethylene glycol 6000 (PEG 6000) | 1.42 |
| talc | 4.25 |
| water | 47.16 |

Furthermore, in the present experiment, there were used the granulating and coating apparatus according to the conventional example having no gas blow-out means and the granulating and coating apparatus according to the present invention, in which the gas blow-out opening of the duct for gas blow-out (gas blow-out means) formed independently of the nozzle unit for liquid feeding is directed to the rear of the rotating direction of the rotary drum relative to the nozzle unit as shown in FIG. 4A.

Table 2 shows the temperatures of the discharged gas (° C.) of the granulating and coating apparatus used in the experiment.

TABLE 2

| TEMPERATURES OF THE DISCHARGED GASES (°C.) | | |
|---|---|---|
| | Conventional Example | This Invention |
| CMEC | 43–47 | 40–42 |
| AQOAT | 36–38 | 38–42 |
| Eudragit (L30D-55) | 40–43 | 40–42 |

Table 3 shows the results of the experiments, by use of No. 1 and No. 2 liquids according to the Japanese pharmacopoeia, of tablets which are granulated and coated products obtained by each apparatuses. These No. 1 and No. 2 liquids are artificial analogues respectively of gastric juice and intestinal juice, No. 1 liquid comprising 2.0 g of NaCl, 24.0 ml of dilute hydrochloric acid and water added to make total amount of mixture 1000 ml, and No. 2 liquid comprising 250 ml of 0.2 mol potassium dihydrogen phosphate reagent, 118 ml of 0.2 N sodium hydroxide reagent and water added to make total amount of mixture 1000 ml.

TABLE 3

| | Conventional Example | This Invention |
|---|---|---|
| CMEC | coated value 13.5% No. 1 liquid: not passed | coated value 12.1% No. 1 liquid: passed time for degradation in No. 2 liquid: 7 min. and 21 sec. |
| AQOAT | coated value 14.5% No. 1 liquid: not passed | coated value 12.0% No. 1 liquid: passed |

TABLE 3-continued

|  | Conventional Example | This Invention |
|---|---|---|
| Eudragit | coated value 8.6%<br>No. 1 liquid: not passed | time for degradation in No. 2 liquid: 5 min. and 14 sec.<br>coated value 8.3%<br>No. 1 liquid: passed<br>time for degradation in No. 2 liquid: 7 min. and 8 sec. |

Notes
(1) A coated value indicates a weight % of a coated film to a tablet.
(2) As for the conventional example, since it did not pass No. 1 liquid test, the experiments by No. 2 liquid were impossible.

What is claimed is:

1. A granulating and coating apparatus comprising,
a rotary drum for containing a powdery or granular material to be processed, said rotary drum having a porous wall member covered by outer enclosure members whereby to form gas flow spaces therebetween;
a nozzle unit for feeding at least one of a coating liquid and a binder liquid into said rotary drum; and
a gas blow-out means for introducing a gas into said drum provided independently of and proximal to said nozzle unit within said rotary drum,
said last mentioned means being rotatable whereby the flow direction of the gas from the gas blow-out means is adjustable between at least a substantially horizontal and at least a substantially downward flow to exit said drum via said gas flow spaces.

2. The granulating and coating apparatus as set forth in claim 1, wherein:
said gas blow-out means is rotatable about an axis thereof for adjustment of the flow direction of the gas introduced into the drum through said gas blow-out means.

3. The granulating and coating apparatus as set forth in claim 1, wherein:
a perforated ventilating member is provided over a gas blow-out opening of said gas blow-out means.

4. The granulating and coating apparatus as set forth in claim 2, wherein:
a perforated ventilating member is provided over a gas blow-out opening of said gas blow-out means.

* * * * *